United States Patent
Prasad et al.

(10) Patent No.: US 12,001,329 B2
(45) Date of Patent: Jun. 4, 2024

(54) SYSTEM AND METHOD FOR STORAGE CLASS MEMORY TIERING

(71) Applicant: DELL PRODUCTS, LP, Round Rock, TX (US)

(72) Inventors: Parmeshwr Prasad, Bangalore (IN); Anusha Bhaskar, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/141,666

(22) Filed: Jan. 5, 2021

(65) Prior Publication Data
US 2022/0214965 A1    Jul. 7, 2022

(51) Int. Cl.
*G06F 12/02* (2006.01)
*G06F 9/50* (2006.01)
*G06F 12/0882* (2016.01)
*G06F 12/1045* (2016.01)
*G06N 20/00* (2019.01)

(52) U.S. Cl.
CPC ........ *G06F 12/0238* (2013.01); *G06F 9/5016* (2013.01); *G06F 12/0882* (2013.01); *G06F 12/1054* (2013.01); *G06F 12/1063* (2013.01); *G06N 20/00* (2019.01); *G06F 2212/1021* (2013.01)

(58) Field of Classification Search
CPC ............... G06F 12/0238; G06F 9/5016; G06F 12/0882; G06F 12/1054; G06F 12/1063; G06F 2212/1021; G06N 20/00
See application file for complete search history.

(56) References Cited

U.S. PATENT DOCUMENTS

| | | | | |
|---|---|---|---|---|
| 6,195,731 B1 * | 2/2001 | Bordaz | ............... | G06F 12/0813 711/147 |
| 7,587,572 B1 * | 9/2009 | Stenstrom | ............... | G06F 12/08 711/173 |
| 10,078,642 B1 * | 9/2018 | Tripathi | .............. | G06F 12/0871 |
| 10,810,123 B1 * | 10/2020 | Xu | ....................... | G06F 12/0804 |

(Continued)

OTHER PUBLICATIONS

Intel Corporation, "NVDIMM Namespace Specification", Apr. 2015, Revision 1.0 retrieved from https://pmem.io/documents/NVDIMM_Namespace_Spec.pdf on Nov. 20, 2023.

(Continued)

*Primary Examiner* — Michael Krofcheck
*Assistant Examiner* — Janice M. Girouard
(74) *Attorney, Agent, or Firm* — Larson Newman, LLP (57) ABSTRACT

A memory device defines portions of the storage space as memory mode memory or storage mode memory. Memory mode memory is represented as a portion of a system physical address space of an information handling system, and storage mode memory is represented as a storage device in the information handling system. An operating system instantiates a paged virtual memory architecture on the information handling system. The information handling system determines a page miss rate for pages stored in the first portion of the storage space, receives a request to increase a first size of the first portion of storage space in response to determining the page miss rate, and increases the first size of the first portion of storage space to a second size in response to the request.

18 Claims, 7 Drawing Sheets

(56) References Cited

U.S. PATENT DOCUMENTS

| | | | |
|---|---|---|---|
| 10,866,732 B2 | 12/2020 | Asano et al. | |
| 2007/0088920 A1* | 4/2007 | Garcia | G06F 12/08 |
| | | | 711/154 |
| 2007/0186074 A1 | 8/2007 | Bradford et al. | |
| 2010/0191779 A1* | 7/2010 | Hinrichs | G06F 3/0605 |
| | | | 711/170 |
| 2012/0059989 A1* | 3/2012 | Hamaguchi | G06F 3/061 |
| | | | 711/E12.019 |
| 2016/0378655 A1* | 12/2016 | Blagodurov | G06F 12/0811 |
| | | | 711/122 |
| 2019/0108015 A1* | 4/2019 | Sridhara | G06Q 30/0282 |
| 2020/0349067 A1* | 11/2020 | Syamala | G06F 16/24552 |
| 2020/0363974 A1* | 11/2020 | Wei | G06F 3/0604 |
| 2021/0406140 A1* | 12/2021 | Sethi | G06N 3/0472 |

OTHER PUBLICATIONS

Intel Corporation, "Intel® Optane™ Persistent Memory Module", Oct. 2022, Revision 3.0 retrieved from https://pmem.io/documents/IntelOptanePMem_DSM_Interface-V3.0.pdf on Nov. 20, 2023.
Intel Corporation, "Update documentation and cmake files" retrieved from https://github.com/intel/ipmctl/blob/master/Documentation/ipmctl/Debug/ipmctl-delete-pcd.txt on Nov. 20, 2023.

* cited by examiner

SYSTEM AND METHOD FOR STORAGE CLASS MEMORY TIERING

FIELD OF THE DISCLOSURE

This disclosure generally relates to information handling systems, and more particularly relates to providing storage class memory tiering for improving virtual memory performance in an information handling system.

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

A memory device of an information handling system may define portions of the storage space as memory mode memory or storage mode memory. Memory mode memory may be represented as a portion of a system physical address space of the information handling system, and storage mode memory may be represented as a storage device in the information handling system. An operating system may instantiate a paged virtual memory architecture on the information handling system. The information handling system may determine a page miss rate for pages stored in the first portion of the storage space, receive a request to increase a first size of the first portion of storage space in response to determining the page miss rate, and increase the first size of the first portion of storage space to a second size in response to the request.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
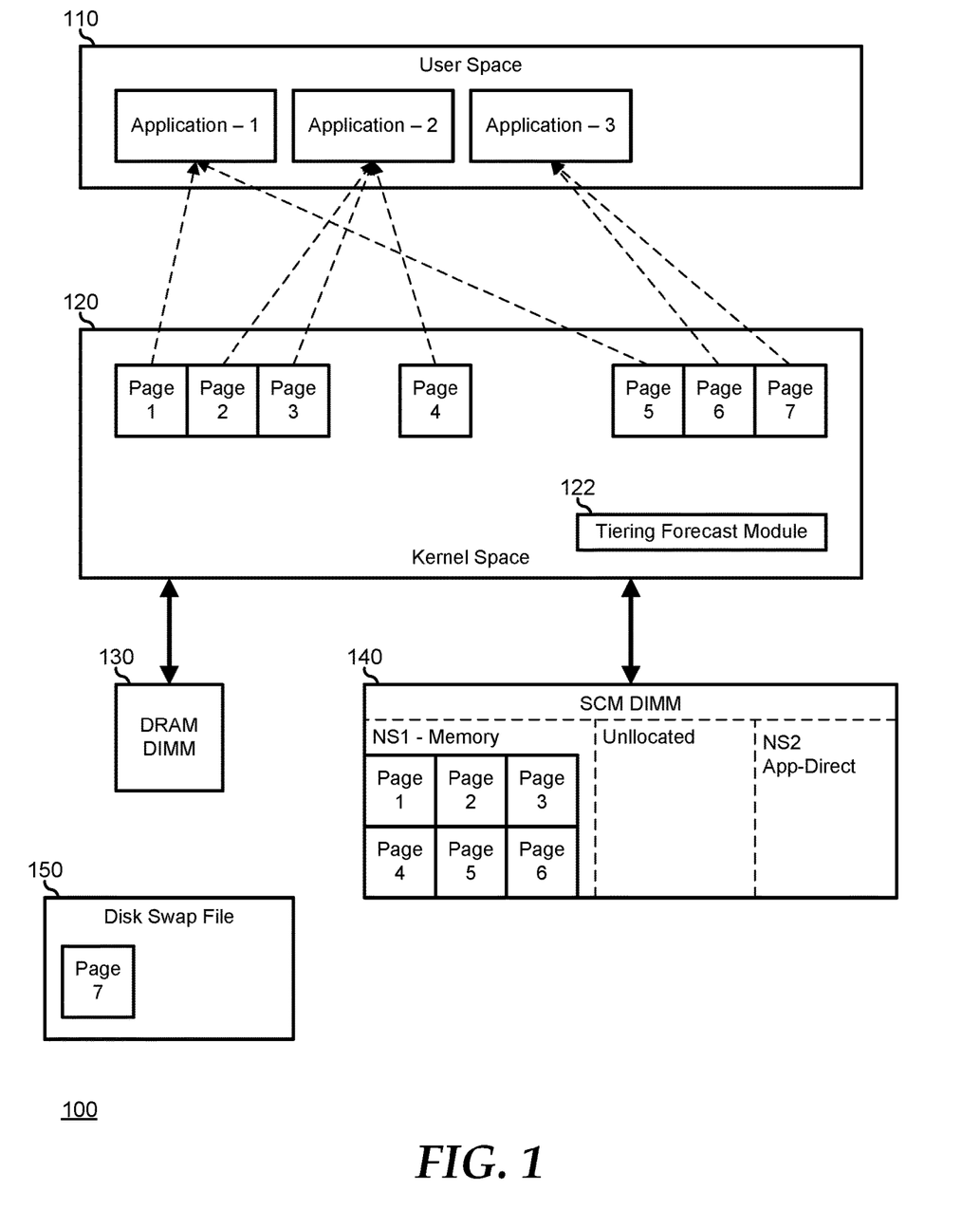
FIGS. 1-4 are block diagrams of an information handling system and various use cases thereof, according to an embodiment of the current disclosure.

FIG. 1 illustrates an information handling system 100, including a user space 110, a kernel space 120, a dynamic random access memory (DRAM) dual in-line memory module (DIMM) 130, a storage class memory (SCM) DIMM 140, and a swap disk 150. User space 110 represents a software layer instantiated on information handling system 100 where various processes, application, programs, or other code are operating. Here, in FIG. 1, user space 110 is illustrates as instantiating three applications. Information handling system 100 will be understood to implement a paged virtual memory architecture, where each of the applications accesses memory through a paging mechanism instantiated on a processor of the information handling system. As such, application 1 utilizes two pages of kernel space 120, application 2 utilizes three pages, and application 3 utilizes two pages. Here, kernel space 120 may represent a processor function, an OS function, or the like for managing the paging into and out of DRAM DIMM 130 and SCM DIMM 140 from swap disk 150, as described further below. The details of information handling systems that utilize a paged virtual memory architecture are known in the art, and will not be further described herein, except as needed to illustrate the current embodiments.

DIMMs 130 and 140 represent memory devices that are utilized to compose the system physical address (SPA) space of information handling system 100. In a particular embodiment, DRAM DIMM 130 and portions of SCM DIMM 140 combine to make up the SPA space. Here, SCM DIMM 140 operates to instantiate different namespaces on the SCM DIMM that define areas of the memory space of the SCM DIMM that are utilized in different ways within information handling system 100. For example, where SCM DIMM 100 represents an Intel Optane DC Persistent Memory (DCPMM), the SCM DIMM can operate in a memory mode or in an app-direct (storage) mode, as defined by labels provided in a label storage area (LSA) of the SCM DIMM. Here, where a particular portion of the memory space of SCM DIMM 140 is defined as being a memory mode portion, that portion of the memory space of the SCM DIMM is operated upon by information handling system 100 as being a portion of the SPA space of the information handling system.

Further, where a particular portion of the memory space of SCM DIMM 140 is defined as being a memory mode portion, the memory space of DRAM DIMM 130 is utilized as a memory cache for the memory mode portion of SCM DIMM 140. That is, the memory space of DRAM DIMM 130 does not add to the overall SPA space of information handling system 100. Thus, as illustrated in FIG. 1, a first namespace (NS1) is defined in SCM DIMM 140 as being in the memory mode, and the data associated with pages 1-6 from kernel space 120 are shown as being stored in the memory mode space associated with the first namespace (NS1). However, it is further apparent that the memory storage capacity of the first namespace (NS1) is not large enough to accommodate all of the data from the pages from kernel space 120. Hence, the data associated with page 7 is shown as being stored on swap disk 150.

The example where SCM DIMM 140 represents an Intel Optane DC Persistent Memory (DCPMM) is illustrative of the current embodiments. However other embodiments where the memory space of DRAM DIMM 130 is included in the SPA of information handling system 100, and is not utilized as a cache memory for SCM DIMM 140 may also be utilized in accordance with the current embodiments. FIG. 1 captures a moment in time, and at other times other pages may be swapped from the memory mode storage space of SCM DIMM 140 to swap disk 150, and vice versa, as needed or desired in accordance with the particular paged virtual memory architecture.

Figure 2:
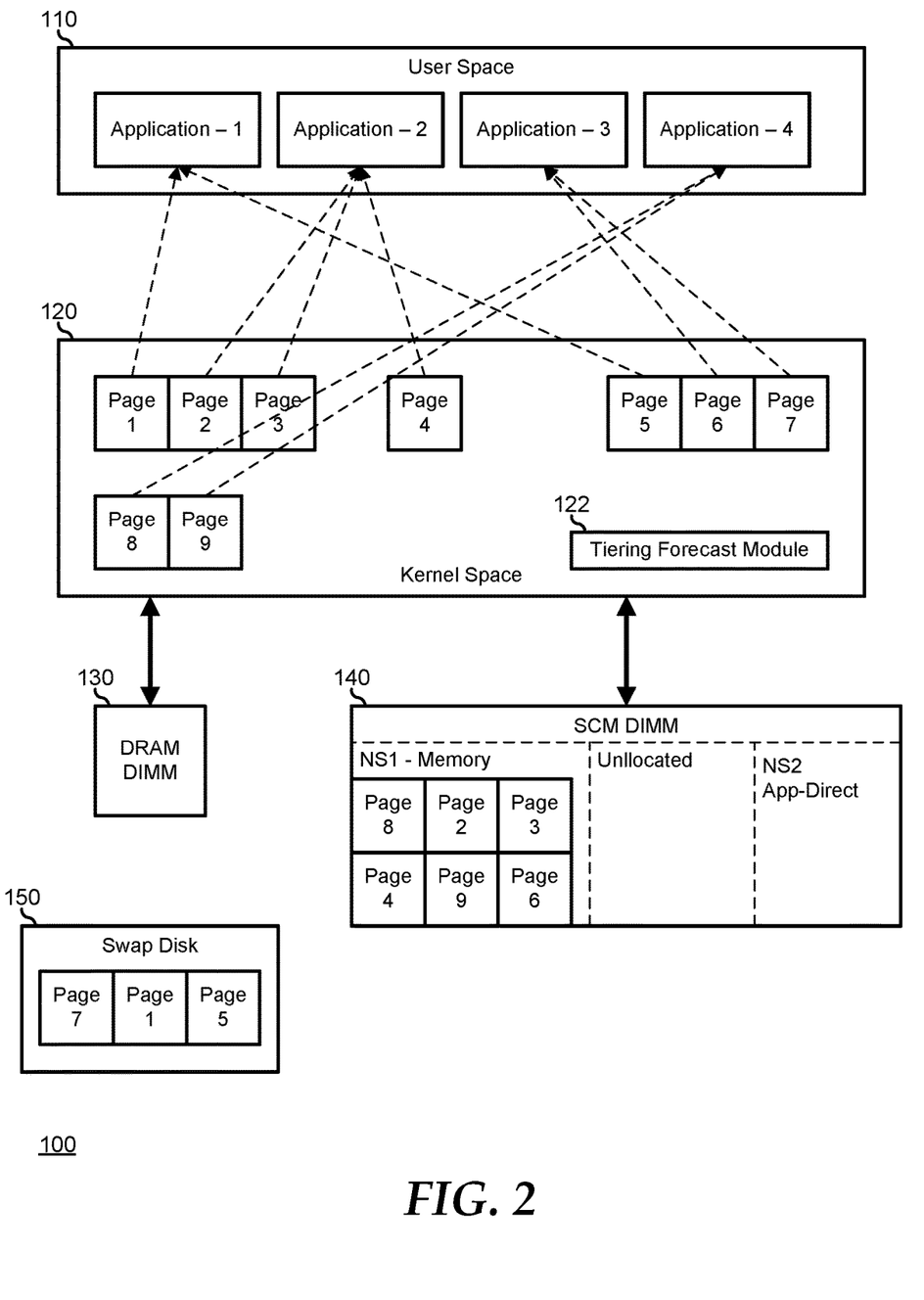

In FIG. 2, information handling system 100 is depicted as having instantiated a fourth application in user space 110, necessitating the creation of two additional pages 8 and 9 in kernel space 130. Here, as the first namespace (NS1) of SCM DIMM 140 does not have enough storage capacity to store the data associated with pages 8 and 9, two pages, here pages 1 and 5, are swapped to swap disk 150. It will be noted that as the number of applications instantiated on information handling system 100 increases, the number of pages created in kernel space 120 will likewise increase, and the overall performance of the information handling system will decrease due to the increased swapping of page data from the first namespace (NS1) of SCM DIMM 140 and swap disk 150.

Figure 3:
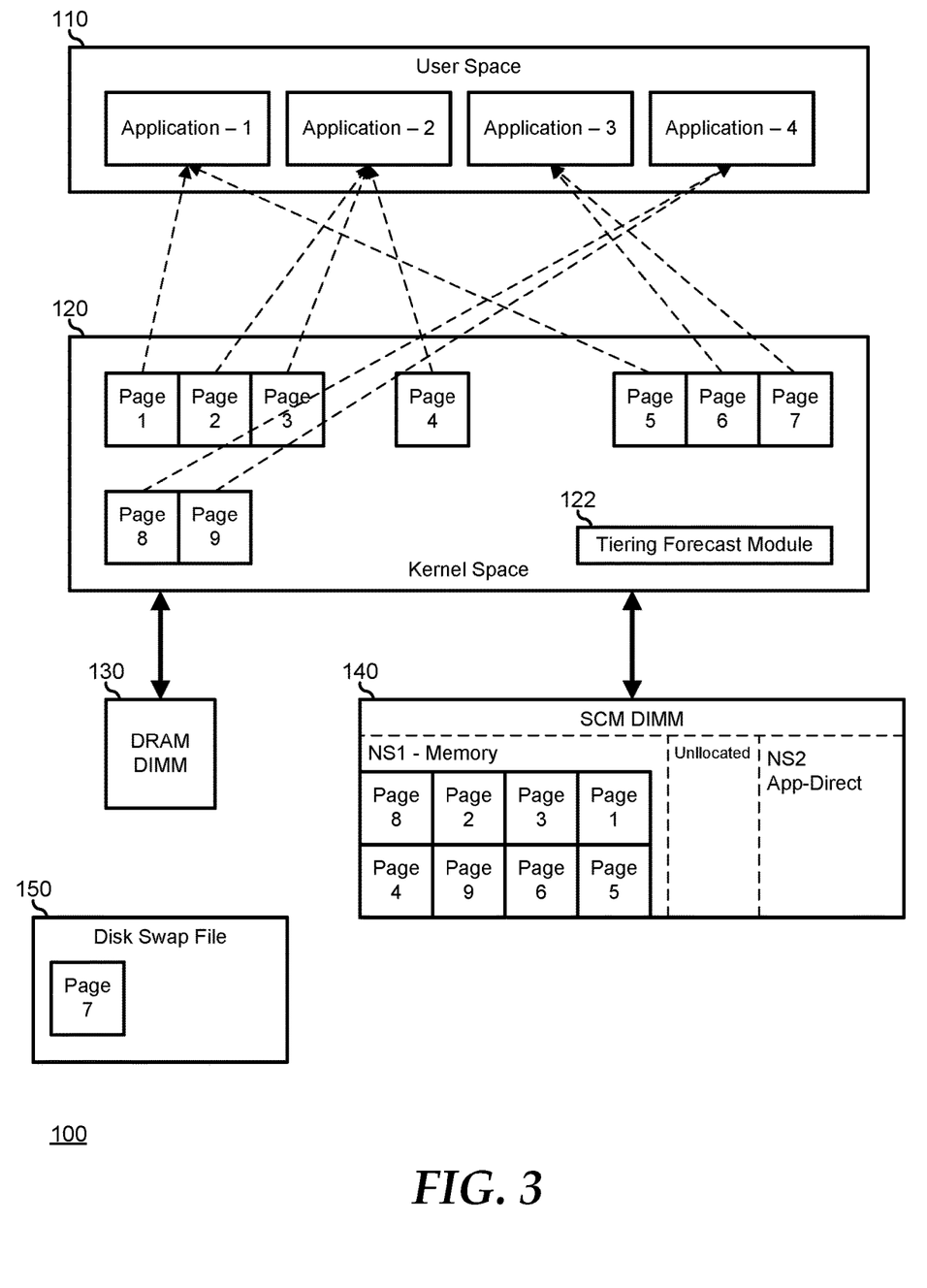
Figure 4:
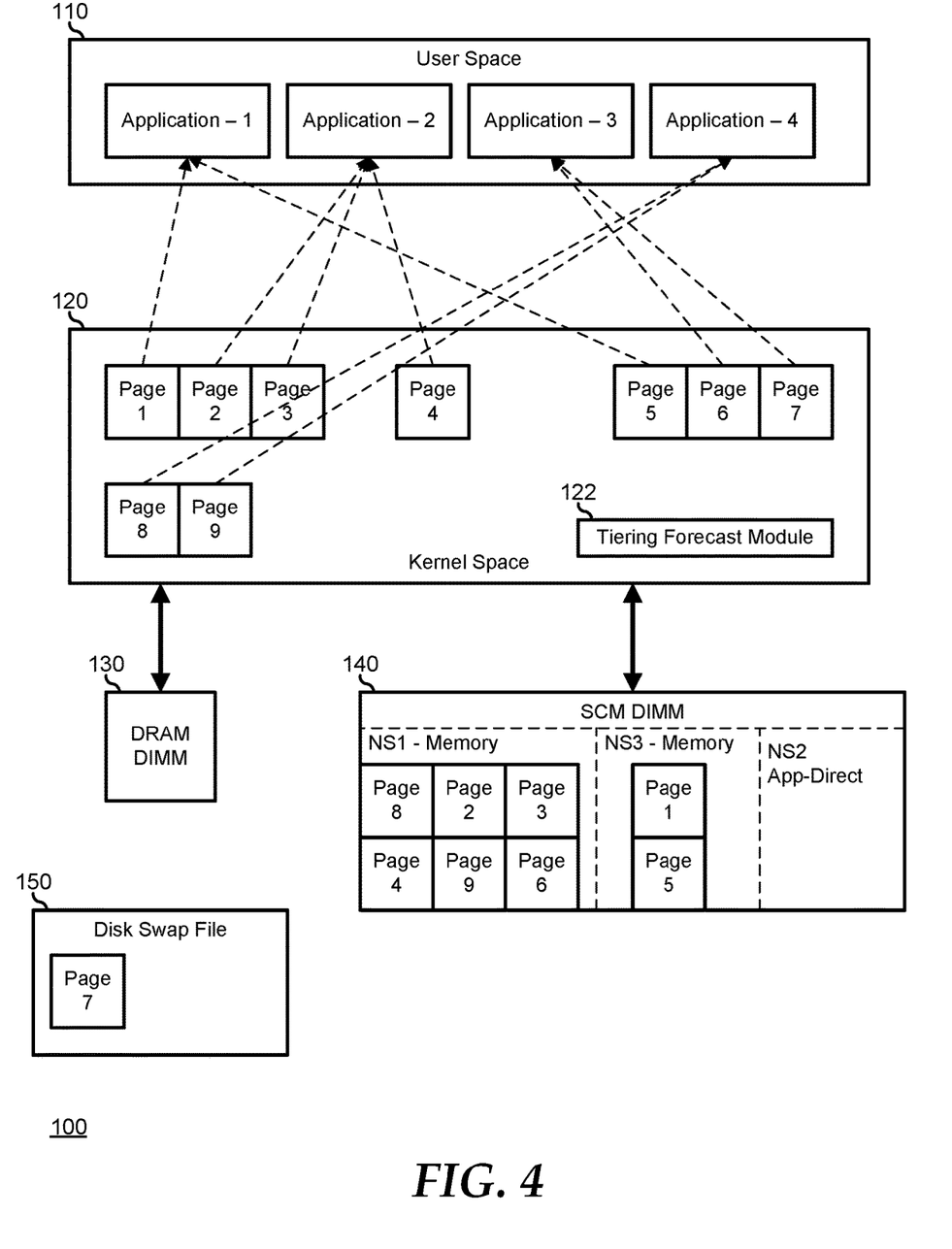

Kernel space 120 includes a tiering forecast module 122 that operates to track the rate of page misses, that is, the rate at which a call for the data associated with a particular page necessitates a page swap from swap disk 150 into the SPA space of information handling system. Tiering forecast module 122 further tracks the total capacity of SCM DIMM 140 and any other installed SCM DIMMs, and the portion of that capacity that is configured in the memory mode. Then, when the rate of page misses increases, tiering forecast module 122 operates to dynamically assign more of SCM DIMM 140 to the memory mode, thereby effectively increasing the size of the SPA space of information handling system 100. In a particular embodiment, as depicted in FIG. 3, tiering forecast module 122 operates to increase the size of the first namespace (NS1) to permit the storage of data from additional pages, thereby reducing the amount of activity swapping page data to and from swap disk 150. In another embodiment, as depicted in FIG. 4, tiering forecast module 122 operates to define a new namespace (NS3) that is configured in the memory mode, permitting the storage of data from additional pages, again reducing the amount of activity swapping page data to and from swap disk 150.

In a particular embodiment, tiering forecast module 122 operates reactively, based upon predefined thresholds for page misses. Here, when a threshold for page misses is exceeded, tiering forecast module 122 determines a set amount of the SCM DIMM capacity, for example in 64 megabyte (MB) increments, to set into memory mode. For example, tiering forecast module 122 may provide a forecast based upon a percentage of resources used and the rate of page misses, using a linear regression model to extrapolate and predict future rates of page misses, and can reallocate the storage space of SCM DIMM 140 when the predicted rates exceed a threshold. Here, tiering forecast module 122 can calculate a weighted mean average of memory usage over time.

In another embodiment, tiering forecast module 122 operates proactively, based upon a machine learning model to predict a best usage of SCM DIMM 140 and to size the amount of memory capacity to be placed into the memory mode. Here, newly allocated memory of SCM DIMM 140 is utilized, along with periodic changes to the allocation, and predictions can be adjusted based upon the machine learning model. For example, tiering forecast module 122 can utilize an autoregressive integrated moving average (ARIMA) model in conjunction with a binary classifier model to provide predictions. An ARIMA model provides that differences of the variable of interest over time, the amount of storage space of SCM DIMM 140 that is dedicated to memory mode, are regressed on lagged input values of the variable, where the regression error is determined as a linear combination of contemporaneous and past values. The ARIMA model provides a forecast of the required amount of storage space to be configured in the memory mode, and the binary classifier model provides a binary (yes/no) decision to change the size of the storage space configured in the memory mode or not. In a particular case, average daily memory usage and page miss data can be gathered, and a difference from a present state is predicted as:

$$mem_k = Z_{k-1} + mem_{k-1} = Z_{k-1} + Z_{k-2} + mem_{k-2} = \ldots \Sigma(i=1 \text{ to } k=x) Z_{k-i} + mem_x$$

where mem is an average memory usage on a given day, and Z is a difference, such that:

$$Z_t = mem_{t+1} - mem_t.$$

Figure 5:
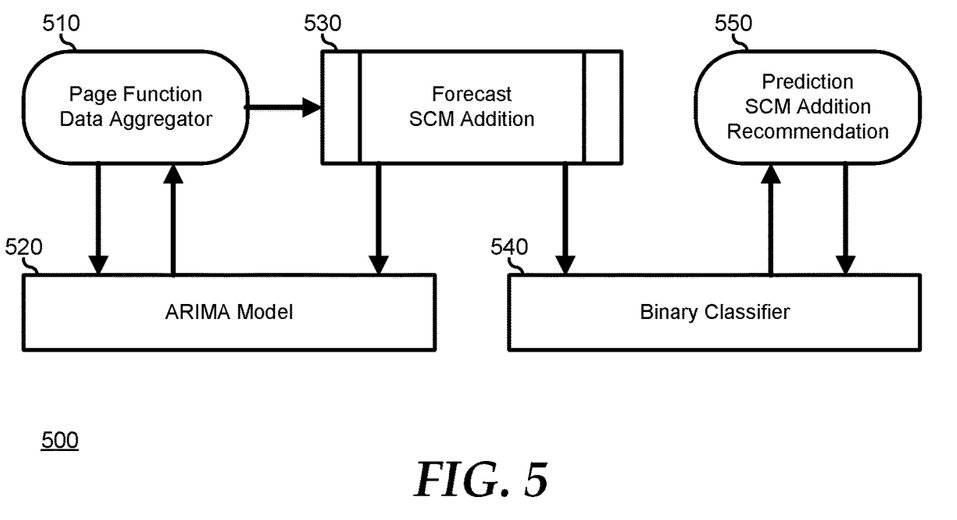
FIG. 5 is a block diagram of a machine learning model for providing storage class memory tiering according to an embodiment of the current disclosure.

An example ARIMA model and binary classifier model combination 500 is shown in FIG. 5. Here, page function data 510 is provided to ARIMA model 520 and a forecasted mean memory difference is provided 530. An error feedback as compared with current data is provided back to ARIMA model 520. The forecasted mean memory difference is provided to a binary classifier 540 to determine a predicted addition/subtraction recommendation 550 for the SCM DIMM. An error feedback is provided to binary classifier 540.

An example ARIMA model and binary classifier model combination 500 is shown in FIG. 5. Here, page function data 510 is provided to ARIMA model 520 and a forecasted mean memory difference is provided 530. An error feedback as compared with current data is provided back to ARIMA model 520. The forecasted mean memory difference is provided to a binary classifier 540 to determine a predicted addition/subtraction recommendation 550 for the SCM DIMM. An error feedback is provided to binary classifier 140.

After tiering forecast module 122 provides a recommendation to increase or decrease the allocation of memory mode storage space on SCM DIMM 140, the tiering forecast module operates to change the allocation of the memory mode storage space in accordance with the recommendation. Here, broadly, tiering forecast module 122 operates to verify that SCM DIMM 120 is operable in the memory mode, to modify the platform control data (PCD) of the SCM DIMM, to convert the address ranges to memory mode memory and enumerate the new memory in the SPA, and to add the new pages to kernel space 120 and store the data associated with the new pages to the newly enumerated SPA. As described herein, the steps taken to change the allocation of the memory mode storage space are illustrated based upon the use of Intel Optane DCPMM memory modules.

As noted above this illustration is exemplary, and other steps may be needed in order to change the allocation of memory mode storage space in other SCM DIMMs, as needed or desired. In verifying that SCM DIMM 120 is operable in the memory mode, tiering forecast module 122 operates to read the Platform Memory Topology Table (PMTT) ACPI table. The PMTT describes the memory topology of information handling system 100 for the Operating System Power Management (OSPM) system instantiated on the information handling system. In particular, the PMTT may provide information as to whether or not a particular memory socket is enabled, and whether or not the enabled DIMM is a SCM DIMM. Further, an entry in the PMTT may indicate that the SCM DIMM is operable in both the memory mode and the app-direct mode.

In modifying the PCD of SCM DIMM 140, tiering forecast module 122 operates to delete the LSA partition in the PCD of SCM DIMM 140. Here, it will be understood that modifying the BIOS portion of the PCD of SCM DIMM 140 is a destructive operation that clears the LSA, including all namespace labels and the namespace index block, and any data stored on the deleted namespaces becomes inaccessible. As such, modifying the BIOS portion of the PCD of SCM DIMM 140 is typically done to repurpose the entire SCM DIMM. However, deleting the LSA partition on SCM DIMM 140 removes the logical OS namespace mappings to the data stored in the SCM DIMM, but does not explicitly delete the data stored persistently on the SCM DIMM. As such, tiering forecast module 122 operates to delete the LSA partition and to modify the previously instantiated namespaces to re-provision SCM DIMM in accordance with the recommendation to increase or decrease the portion of the SCM DIMM that is in the memory mode. Here, tiering forecast module 122 can re-provision the modified namespaces to the LSA using a "create-goal" or "load-goal" command, thereby permitting the SCM DIMM to be reprovisioned in isolation.

In converting the address ranges to memory mode memory and enumerating the new memory in the SPA, tiering forecast module 122 operates to modify the SPA range structure in the NVDIMM Firmware Interface Table (NFIT) in the BIOS of information handling system 100. In particular tiering forecast module 122 modifies a System Physical Address Range Base and System Physical Address Range Length in accordance with the new allocation of memory mode storage space in SCM DIMM 140 during a runtime execution of a FIT enumeration method associated with ACPI operations. Here, when the PCD is modified, as described above, a NFIT Notification value for the root NVDIMM device is set, notifying OSPM that the FIT method needs to be reevaluated, similarly to the method as performed when a DIMM memory device is hot-plugged into information handling system 100. Tiering forecast module 122 then passes control back to information handling system 100 to add new pages to kernel space 120, and to store the data associated with the new pages to the newly enumerated SPA.

Figure 6:
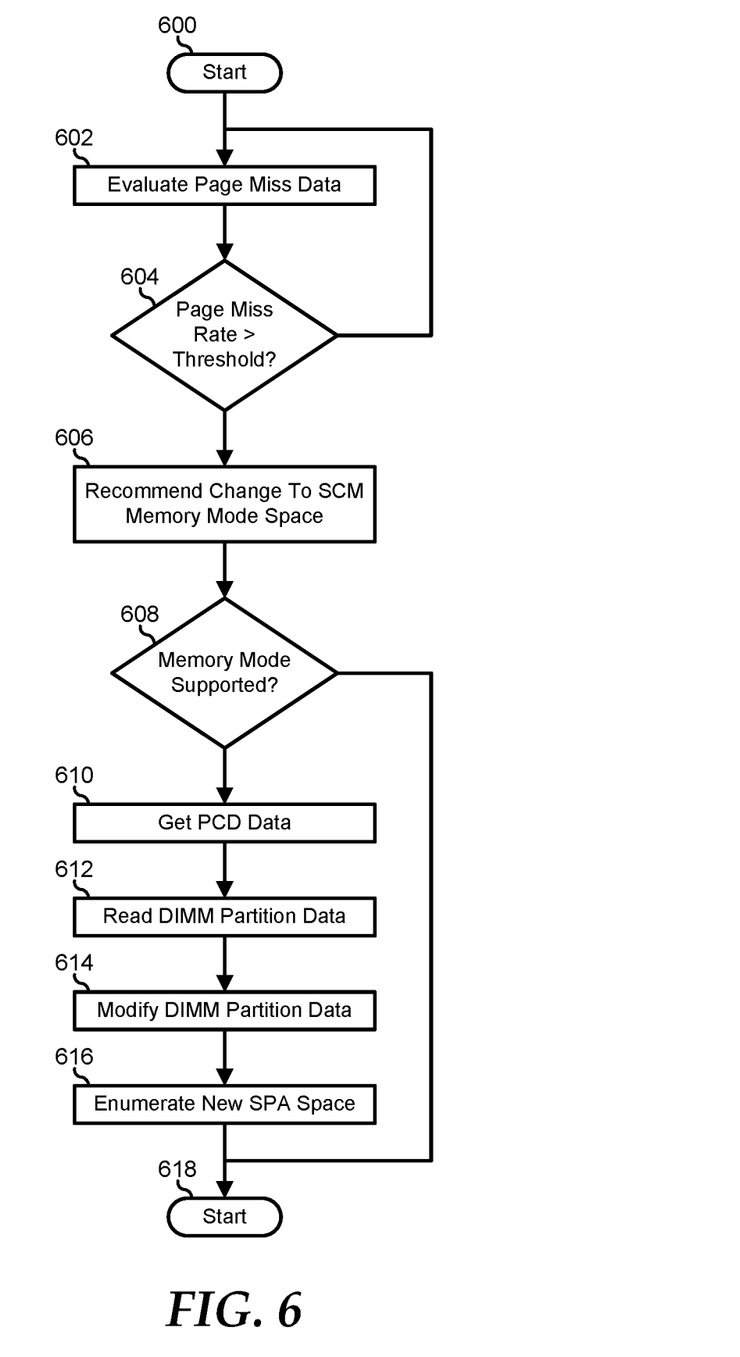
FIG. 6 is a flowchart illustrating a method for providing storage class memory tiering according to an embodiment of the current disclosure.

FIG. 6 illustrates a method for providing storage class memory tiering starting at block 600. Page miss rate data is evaluated in block 602 and a decision is made as to whether or not the page miss rate is greater than a threshold in decision block 604. If not, the "NO" branch of decision block 604 is taken and the method loops back to block 602 where new page miss rate data is evaluated. If the page miss rate is greater than the threshold, the "YES" branch of decision block 604 is taken and a recommendation is made to change the amount of memory mode storage space in a SCM DIMM in block 606. A decision is made as to whether or not the memory mode is supported by the SCM DIMM in decision block 608. If not, the "NO" branch of decision block 608 is taken and the method ends in block 618. If the SCM CIMM supports memory mode storage, the "YES" branch of decision block 608 is taken and the PCD is read from the SCM DIMM in block 610. The partition data is read from the PCD in block 612, and is modified in block 616. The newly allocated memory mode storage space is enumerated in the SPA of the information handling system in block 616, and the method ends in block 618.

Figure 7:
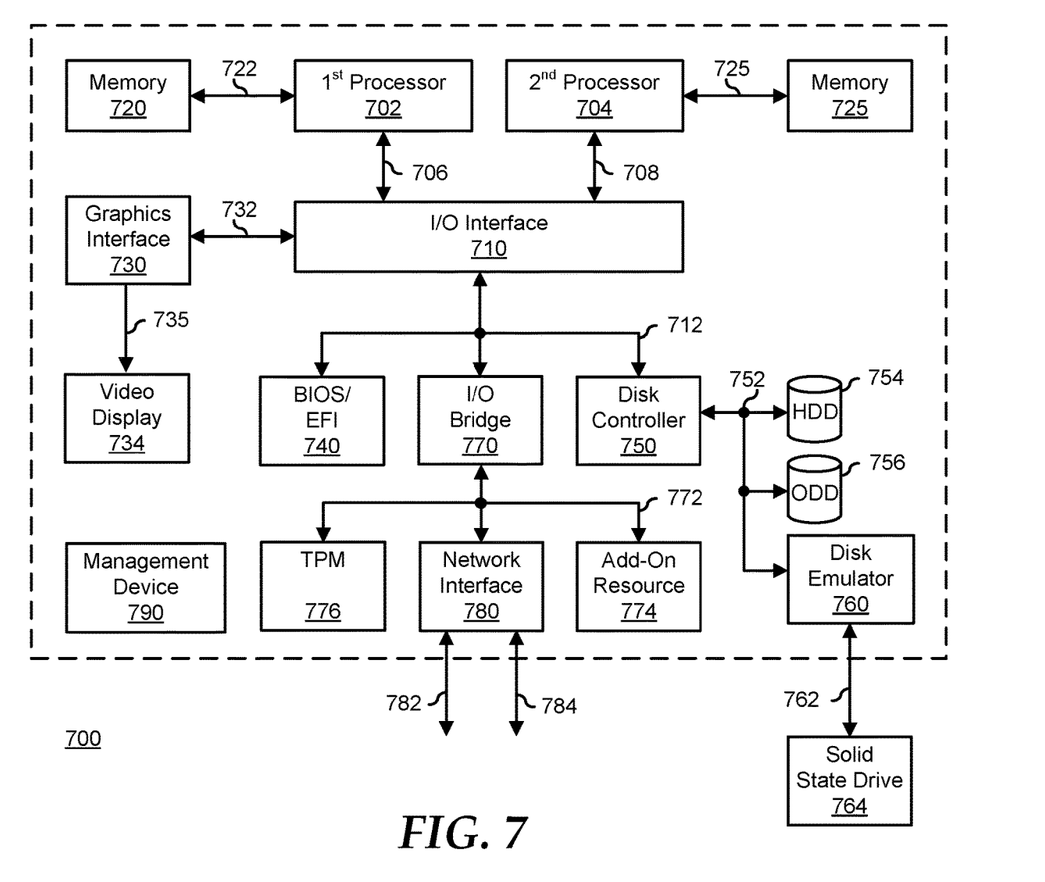
FIG. 7 is a block diagram illustrating a generalized information handling system according to another embodiment of the current disclosure.

FIG. 7 illustrates a generalized embodiment of an information handling system 700. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 700 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 700 can include processing resources for executing machine-executable code, such as a central processing unit (CPU), a programmable logic array (PLA), an embedded device such as a System-on-a-Chip (SoC), or other control logic hardware. Information handling system 700 can also include one or more computer-readable medium for storing machine-executable code, such as software or data. Additional components of information handling system 700 can include one or more storage devices that can store machine-executable code, one or more communications ports for communicating with external devices, and various input and output (I/O) devices, such as a keyboard, a mouse, and a video display. Information handling system 700 can also include one or more buses operable to transmit information between the various hardware components.

Information handling system 700 can include devices or modules that embody one or more of the devices or modules described below, and operates to perform one or more of the methods described below. Information handling system 700 includes a processors 702 and 704, an input/output (I/O) interface 710, memories 720 and 725, a graphics interface 730, a basic input and output system/universal extensible firmware interface (BIOS/UEFI) module 740, a disk controller 750, a hard disk drive (HDD) 754, an optical disk drive (ODD) 756, a disk emulator 760 connected to an external solid state drive (SSD) 762, an I/O bridge 770, one or more add-on resources 774, a trusted platform module (TPM) 776, a network interface 780, a management device 790, and a power supply 795. Processors 702 and 704, I/O interface 710, memory 720, graphics interface 730, BIOS/UEFI module 740, disk controller 750, HDD 754, ODD 756, disk emulator 760, SSD 762, I/O bridge 770, add-on resources 774, TPM 776, and network interface 780 operate together to provide a host environment of information handling system 700 that operates to provide the data processing functionality of the information handling system. The host environment operates to execute machine-executable code, including platform BIOS/UEFI code, device firmware, operating system code, applications, programs, and the like, to perform the data processing tasks associated with information handling system 700.

In the host environment, processor 702 is connected to I/O interface 710 via processor interface 706, and processor 704 is connected to the I/O interface via processor interface 708. Memory 720 is connected to processor 702 via a memory interface 722. Memory 725 is connected to processor 704 via a memory interface 727. Graphics interface 730 is connected to I/O interface 710 via a graphics interface 732, and provides a video display output 736 to a video display 734. In a particular embodiment, information handling system 700 includes separate memories that are dedicated to each of processors 702 and 704 via separate memory interfaces. An example of memories 720 and 730 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 740, disk controller 750, and I/O bridge 770 are connected to I/O interface 710 via an I/O channel 712. An example of I/O channel 712 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 710 can also include one or more other I/O interfaces, including an Industry Standard Architecture (ISA) interface, a Small Computer Serial Interface (SCSI) interface, an Inter-Integrated Circuit (I²C) interface, a System Packet Interface (SPI), a Universal Serial Bus (USB), another interface, or a combination thereof. BIOS/UEFI module 740 includes BIOS/UEFI code operable to detect resources within information handling system 700, to provide drivers for the resources, initialize the resources, and access the resources. BIOS/UEFI module 740 includes code that operates to detect resources within information handling system 700, to provide drivers for the resources, to initialize the resources, and to access the resources.

Disk controller 750 includes a disk interface 752 that connects the disk controller to HDD 754, to ODD 756, and to disk emulator 760. An example of disk interface 752 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 760 permits SSD 764 to be connected to information handling system 700 via an external interface 762. An example of external interface 762 includes a USB interface, an IEEE 1394 (Firewire) interface, a proprietary interface, or a combination thereof. Alternatively, solid-state drive 764 can be disposed within information handling system 700.

I/O bridge 770 includes a peripheral interface 772 that connects the I/O bridge to add-on resource 774, to TPM 776, and to network interface 780. Peripheral interface 772 can be the same type of interface as I/O channel 712, or can be a different type of interface. As such, I/O bridge 770 extends the capacity of I/O channel 712 when peripheral interface 772 and the I/O channel are of the same type, and the I/O bridge translates information from a format suitable to the I/O channel to a format suitable to the peripheral channel 772 when they are of a different type. Add-on resource 774 can include a data storage system, an additional graphics interface, a network interface card (NIC), a sound/video processing card, another add-on resource, or a combination thereof. Add-on resource 774 can be on a main circuit board, on separate circuit board or add-in card disposed within information handling system 700, a device that is external to the information handling system, or a combination thereof.

Network interface 780 represents a NIC disposed within information handling system 700, on a main circuit board of the information handling system, integrated onto another component such as I/O interface 710, in another suitable location, or a combination thereof. Network interface device 780 includes network channels 782 and 784 that provide interfaces to devices that are external to information handling system 700. In a particular embodiment, network channels 782 and 784 are of a different type than peripheral channel 772 and network interface 780 translates information from a format suitable to the peripheral channel to a format suitable to external devices. An example of network channels 782 and 784 includes InfiniBand channels, Fibre Channel channels, Gigabit Ethernet channels, proprietary channel architectures, or a combination thereof. Network channels 782 and 784 can be connected to external network resources (not illustrated). The network resource can include another information handling system, a data storage system, another network, a grid management system, another suitable resource, or a combination thereof.

Management device 790 represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide the management environment for information handling system 700. In particular, management device 790 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 700, such as system cooling fans and power supplies. Management device 790 can include a network connection to an external management system, and the management device can communicate with the management system to report status information for information handling system 700, to receive BIOS/UEFI or system firmware updates, or to perform other task for managing and controlling the operation of information handling system 700. Management device 790 can operate off of a separate power plane from the components of the host environment so that the management device receives power to manage information handling system 700 when the information handling system is otherwise shut down. An example of management device 790 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 790 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system, comprising:
    a non-volatile random access memory (NVRAM) device having a storage space and including a Label Storage Area (LSA) partition to store namespaces, each namespace defining an associated portion of the storage space as being one of a memory mode memory or a storage mode memory, wherein the LSA partition includes a first namespace defining a first portion of the storage space as a first memory mode memory having a first size, and a second namespace defining a second portion of the storage space as a first storage mode memory, wherein storage space of the NVRAM device that is defined as memory mode memory is represented as a portion of a system physical address space of the information handling system, and wherein storage space of the NVRAM device that is defined as storage mode memory is represented as a storage device in the information handling system; and
    an operating system configured to instantiate a paged virtual memory architecture on the information handling system;
    wherein the information handling system is configured to determine a page miss rate for pages stored in the first portion of the storage space, to receive a request to increase the first size of the first portion of storage space in order to increase the system physical address space of the information handling system in response to determining the page miss rate, and to increase the first size of the first portion of storage space to a second size in response to the request, wherein, in increasing the first size of the first portion to the second size, the information handling system is further configured to delete the LSA partition, to rewrite the second namespace to the LSA partition to define the second portion of the storage space as the first storage mode memory, and to write a third namespace to the LSA to define a third portion of the storage space as a second memory mode memory, the third portion including the first portion of the storage space and an additional portion of the storage space.

2. The information handling system of claim 1, wherein the page miss rate includes a weighted average of page misses over time.

3. The information handling system of claim 1, wherein the information handling system is further configured to determine that the page miss rate is greater than a threshold, and to provide the request in response to determining that the page miss rate is greater than the threshold.

4. The information handling system of claim 1, wherein the information handling system is further configured to determine the second size of the first portion of storage space based upon a machine learning model.

5. The information handling system of claim 4, wherein the machine learning model comprises an autoregressive integrated moving average model.

6. The information handling system of claim 5, wherein the machine learning model further comprises a binary classifier.

7. The information handling system of claim 1, wherein, in increasing the first size of the first portion of storage space to the second size, the information handling system is further configured to increase the first size by a predetermined amount of the storage space.

8. The information handling system of claim 7, wherein the predetermined amount of the storage space is 64 megabytes.

9. A method, comprising:
    providing, in an information handling system, a non-volatile random access memory (NVRAM) device having a storage space, and including a Label Storage Area (LSA) partition to store namespaces, each namespace defining an associated portion of the storage space as being one of a memory mode memory or a storage mode memory, wherein storage space of the NVRAM device that is defined as memory mode memory is represented as a portion of a system physical address space of the information handling system, and wherein storage space of the NVRAM device that is defined as storage mode memory is represented as a storage device in the information handling system;
    defining, by a first namespace of the (LSA) partition, a first portion of storage space of the NVRAM device as a first memory mode memory having a first size;
    defining, by a second namespace of the LSA partition, a first portion of the storage space as a first storage mode memory;
    instantiating, on an operating system of the information handling system, a paged virtual memory architecture on the information handling system;
    determining a page miss rate for pages stored in the first portion of the storage space;
    receiving a request to increase the first size of the first portion of storage space in order to increase the system physical address space of the information handling system in response to determining the page miss rate; and
    increasing the first size of the first portion of storage space to a second size in response to the request;
    wherein, in increasing the first size of the first portion to the second size, the method further comprises:
        deleting the LSA partition;
        writing the second namespace to the LSA partition to define the second portion of the storage space as the first storage mode memory; and
        writing a third namespace to the LSA to define a third portion of the storage space as a second memory mode memory having the second size, the third portion including the first portion of the storage space and an additional portion of the storage space.

10. The method of claim 9, wherein the page miss rate includes a weighted average of page misses over time.

11. The method of claim 9, further comprising:
determining that the page miss rate is greater than a threshold, wherein providing the request is in response to determining that the page miss rate is greater than the threshold.

12. The method of claim 9, wherein the second size of the first portion is determined based upon a machine learning model.

13. The method of claim 12, wherein the machine learning model comprises an autoregressive integrated moving average model, and a binary classifier.

14. The method of claim 9, wherein, in increasing the first size of the first portion of storage space to the second size, the method further comprises:
increasing the first size by a predetermined amount of the storage space.

15. The method of claim 14, wherein the predetermined amount of the storage space is 64 megabytes.

16. An information handling system, comprising:
a dynamic random access memory (DRAM) device;
a non-volatile random access memory (NVRAM) device having a storage space and including a Label Storage Area (LSA) partition to store namespaces, each namespace defining an associated portion of the storage space as being one of a memory mode memory or a storage mode memory, wherein the LSA partition includes configured to a first namespace defining a first portion of the storage space as a first memory mode memory having a first size, and a second namespace defining a second portion of the storage space as a first storage mode memory, wherein a sum of storage space of the DRAM device and the first portion of the storage space of the NVRAM device is represented as a system physical address space of the information handling system, and wherein storage space of the DRAM device that is defined as storage mode memory is represented as a storage device in the information handling system; and
an operating system configured to instantiate a paged virtual memory architecture on the information handling system;
wherein the information handling system is configured to determine a page miss rate for the system physical address space, and to increase the first size of the first portion of storage space of the NVRAM device to a second size in response to a request to increase a first size of the first portion of storage space in order to increase the system physical address space of the information handling system in response to determining the page miss rate, wherein in increasing the first size of the first portion to the second size, the information handling system is further configured to delete the LSA partition, to write the second namespace to the LSA partition to define the second portion of the storage space as the first storage mode memory, and to write a third namespace to the LSA partition to define a third portion of the storage space, as a second memory mode memory, the third portion including the first portion of the storage space and an additional portion of the storage space.

17. The information handling system of claim 16, wherein, in increasing the first size of the first portion of storage space to the second size, the information handling system is further configured to increase the first size by a predetermined amount of the storage space.

18. The information handling system of claim 17, wherein the predetermined amount of the storage space is 64 megabytes.

* * * * *

UNITED STATES PATENT AND TRADEMARK OFFICE
CERTIFICATE OF CORRECTION

PATENT NO. : 12,001,329 B2
APPLICATION NO. : 17/141666
DATED : June 4, 2024
INVENTOR(S) : Parmeshwr Prasad et al.

Page 1 of 1

It is certified that error appears in the above-identified patent and that said Letters Patent is hereby corrected as shown below:

In the Claims

Column 11, Lines 28-29: Please change "partition includes configured to a first namespace" to --partition includes a first namespace--

Signed and Sealed this
Twenty-second Day of October, 2024

Katherine Kelly Vidal
*Director of the United States Patent and Trademark Office*